United States Patent
Peterson et al.

(10) Patent No.: US 9,080,051 B2
(45) Date of Patent: *Jul. 14, 2015

(54) GELATINOUS TRIBLOCK COPOLYMER ELASTOMER PARTICLES IN POLYURETHANE FLEXIBLE FOAMS

(71) Applicant: Peterson Chemical Technology, Inc., Fort Smith, AR (US)

(72) Inventors: Bruce W. Peterson, Fort Smith, AR (US); Mark L. Crawford, Rudy, AR (US)

(73) Assignee: PETERSON CHEMICAL TECHNOLOGY, INC., Fort Smith, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 13/956,005

(22) Filed: Jul. 31, 2013

(65) Prior Publication Data
US 2013/0316164 A1 Nov. 28, 2013

Related U.S. Application Data

(63) Continuation-in-part of application No. 12/713,586, filed on Feb. 26, 2010, now Pat. No. 8,933,139.

(60) Provisional application No. 61/208,854, filed on Feb. 27, 2009.

(51) Int. Cl.
| | |
|---|---|
| C08G 18/06 | (2006.01) |
| C08L 75/04 | (2006.01) |
| C08J 9/00 | (2006.01) |
| C08J 9/04 | (2006.01) |
| C08J 9/42 | (2006.01) |
| C08J 9/40 | (2006.01) |
| C08G 101/00 | (2006.01) |

(52) U.S. Cl.
CPC .............. *C08L 75/04* (2013.01); *C08J 9/0009* (2013.01); *C08J 9/0014* (2013.01); *C08J 9/0061* (2013.01); *C08J 9/04* (2013.01); *C08J 9/405* (2013.01); *C08J 9/42* (2013.01); *C08G 2101/0008* (2013.01); *C08J 2205/05* (2013.01); *C08J 2375/04* (2013.01); *C08J 2409/06* (2013.01); *C08J 2453/00* (2013.01); *Y10T 428/249981* (2015.04)

(58) Field of Classification Search
CPC .............. C08J 2205/05; C08J 2375/04; C08J 2409/06; C08J 9/0009; C08J 9/0014; C08J 9/04; C08J 9/42; C08J 9/405; C08G 2101/0008
USPC ........... 521/65, 69, 70, 71, 99, 134, 137, 139, 521/170
See application file for complete search history.

(56) References Cited

U.S. PATENT DOCUMENTS

| | | | | |
|---|---|---|---|---|
| 3,925,266 A | * | 12/1975 | Fabris et al. | 521/126 |
| 4,452,920 A | | 6/1984 | Joubert | |
| 4,776,356 A | * | 10/1988 | Jou et al. | 15/244.4 |
| 5,262,468 A | | 11/1993 | Chen | |
| 5,312,847 A | * | 5/1994 | de Vos | 521/137 |
| 5,334,646 A | | 8/1994 | Chen | |
| 5,336,708 A | | 8/1994 | Chen | |
| 5,508,334 A | | 4/1996 | Chen | |
| 5,749,111 A | | 5/1998 | Pearce | |
| 5,760,117 A | | 6/1998 | Chen | |
| 5,884,639 A | | 3/1999 | Chen | |
| 6,051,624 A | * | 4/2000 | Bastin et al. | 521/174 |
| 6,063,825 A | * | 5/2000 | Isobe et al. | 521/137 |
| 6,117,176 A | | 9/2000 | Chen | |
| 6,498,198 B2 | | 12/2002 | Pearce | |
| 6,720,362 B1 | | 4/2004 | Park | |
| 6,765,031 B2 | * | 7/2004 | Salyer et al. | 521/99 |
| 7,093,599 B2 | | 8/2006 | Chen | |
| 7,193,002 B2 | | 3/2007 | Chen | |
| 7,222,380 B2 | | 5/2007 | Chen | |
| 7,226,484 B2 | | 6/2007 | Chen | |
| 7,234,560 B2 | | 6/2007 | Chen | |
| 7,344,568 B2 | | 3/2008 | Chen | |

(Continued)

FOREIGN PATENT DOCUMENTS

| | | | |
|---|---|---|---|
| EP | 2336223 A1 | | 6/2011 |
| GB | 2015010 | * | 2/1979 |

(Continued)

OTHER PUBLICATIONS

EPO Search Report in EP Application 14 17 9176 dated Dec. 8, 2014.

*Primary Examiner* — John Cooney
(74) *Attorney, Agent, or Firm* — Mossman Kumar & Tyler PC

(57) ABSTRACT

Combinations of gelatinous elastomer and polyurethane foam may be made by introducing a plasticized triblock copolymer resin and/or a diblock copolymer resin at least partially cured into gel particles into a mixture of polyurethane foam forming components including a polyol and an isocyanate. The plasticized copolymer resin is polymerized to form a cured gelatinous elastomer or gel, which is then reduced in size, for instance to give an average particle size of 10 millimeters or less. Polymerizing the polyol and the isocyanate forms polyurethane foam. The polyurethane reaction is exothermic and can generate sufficient temperature to at least partially melt the styrene-portion of the triblock copolymer resin thereby extending the crosslinking and in some cases integrating the triblock copolymer within the polyurethane polymer matrix. The gel component has higher heat capacity than polyurethane foam and thus has good thermal conductivity and acts as a heat sink.

25 Claims, 6 Drawing Sheets

(56) References Cited

U.S. PATENT DOCUMENTS

| 7,661,164 | B2 | 2/2010 | Chen | |
|---|---|---|---|---|
| 7,930,782 | B2 | 4/2011 | Chen | |
| 2004/0097608 | A1* | 5/2004 | Re'em | 521/170 |
| 2004/0192795 | A1* | 9/2004 | Chevalier et al. | 521/137 |
| 2004/0204511 | A1* | 10/2004 | Tokuyasu et al. | 521/85 |

| 2012/0276339 | A1 | 11/2012 | Pearce et al. |
|---|---|---|---|

FOREIGN PATENT DOCUMENTS

| WO | WO 2012/160515 | * | 11/2012 |
|---|---|---|---|
| WO | 2013072072 | A1 | 5/2013 |
| WO | 2014008250 | A1 | 1/2014 |

* cited by examiner

US 9,080,051 B2

GELATINOUS TRIBLOCK COPOLYMER ELASTOMER PARTICLES IN POLYURETHANE FLEXIBLE FOAMS

CROSS-REFERENCE TO RELATED APPLICATIONS

This application is a continuation-in-part application from U.S. patent application Ser. No. 12/713,586 filed Feb. 26, 2010, which in turn claims the benefit of U.S. provisional application No. 61/208,854 filed Feb. 27, 2009, both of which are incorporated herein by reference in their entirety.

TECHNICAL FIELD

The invention relates to methods for compositions having plasticized gelatinous triblock copolymer elastomers within polyether polyurethane foams, polyester polyurethane flexible foams or latex foams and relates to foams so made, and more particularly relates to plasticized gelatinous triblock copolymer elastomer particles in polyether or polyester polyurethane flexible foams or latex foams and methods for making these materials. The invention more specifically relates to mattresses, pillows, bedding products, furniture upholstery, carpet pads, floor mats, shoe inserts, medical foams, seat cushions and backs, automotive foam, sports cushioning, transportation cushioning, headrests, arm rests and the like.

TECHNICAL BACKGROUND

Flexible polyurethane foam is commonly produced by methods of molding and free-rise. The process of molding polyurethane flexible foam involves introducing chemicals required for making foam (in one non-limiting embodiment, one or more polyols, one or more isocyanates and one or more additives) in the desired ratio by injection or open pour into an individual, multiple or continuous mold and allowing the reacting foam system to fill the mold(s). There are many types of free-rise foam machines. Examples of these include, but are not necessarily limited to, Open-Box Pouring Machines and Continuous Foam Machines such as Direct Lay-Down Machines and Maxfoam Process Machines. In a Continuous Direct Lay-down foam process, chemicals are metered and mixed through a mix-head and applied to a conveyed paper or film, upon which the foam chemicals react and rise as the mix is carried away from the lay-down area.

It is also well known to make gelatinous elastomer materials from KRATON®, SEPTON®, or CALPRENE® triblock copolymer elastomers that have been plasticized with mineral oils or other non-aromatic oils. Gelatinous triblock copolymer elastomers have been produced as articles and used in conjunction with prior and separately manufactured polyurethane or polyester foams, for instance as separate, discrete layers.

It is helpful and desirable to develop new, alternative and/or improved foams and methods for making the same that have combined and/or improved properties.

SUMMARY

There is provided in one non-limiting embodiment a combination of gelatinous elastomer and polyurethane foam produced by the method involving crosslinking a plasticized copolymer resin which may be a triblock copolymer resin, a diblock copolymer resin, and combinations thereof, to give a cured gel. The method further involves reducing the size of the cured gel into gel particles having an average particle size of about 10 millimeters or less. Additionally, the method includes introducing the gelled particles into a mixture of polyurethane foam forming components which include a polyol and an isocyanate. The gel particles are added in the range of about 0.1 to about 200 parts per hundred of the polyol component of polyurethane foam. The method also involves polymerizing the polyol and the isocyanate to form a polyurethane foam.

In a different non-restrictive version there is provided a combination of gelatinous elastomer and open cell flexible polyurethane foam including cured gel particles comprising crosslinked plasticized copolymer resin selected from the group consisting of a triblock copolymer resin, a diblock copolymer resin, and combinations thereof, the gel particles having an average particle size of about 10 millimeters or less within an open cell flexible polyurethane foam. The gel particles are present in the range of about 0.1 to about 200 parts per hundred of the polyol component of open cell flexible polyurethane foam.

Figure 1:
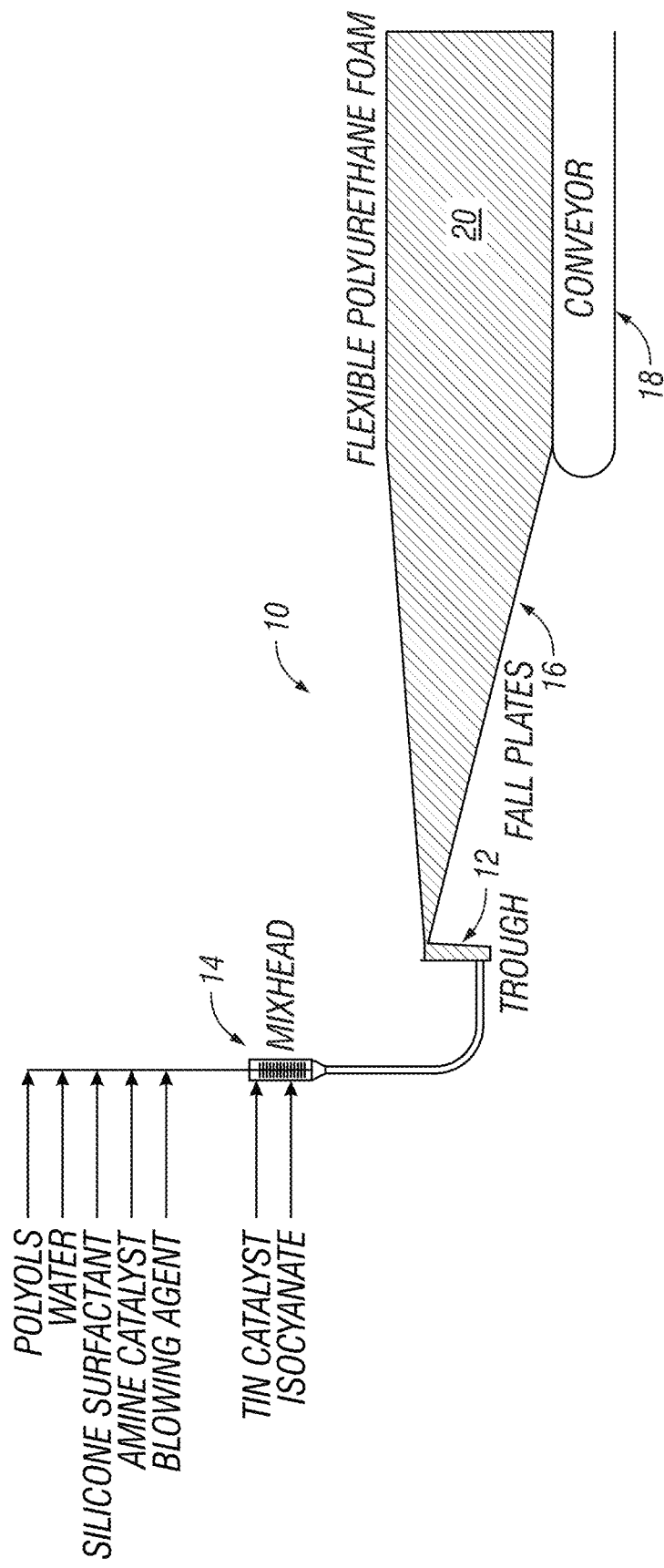
FIG. 1 is a schematic illustration of a continuous, free-rise polyurethane foam processing apparatus.

It will be appreciated that FIGS. 1-4 and 6 are schematic and that the various elements are not necessarily to scale or proportion, and that many details have been removed or simplified for clarity, and thus the invention is not necessarily limited to the embodiments depicted in the Figures.

DETAILED DESCRIPTION

It has been discovered that in-situ incorporation of gelatinous triblock and/or diblock copolymer elastomer particles into open cell, flexible polyether or polyester polyurethane foam may be conducted while the foam is being produced. That is, the plasticized gelatinous copolymer particles are incorporated in the polyurethane foam in-situ during the foaming reaction using the exothermic heat of the foam reaction. Gelatinous triblock copolymer elastomers have been produced as articles and used in conjunction with a prior and separately manufactured polyurethane or polyester foam as discrete, relatively large-scale components or layers, but the methods and items made herein relate to incorporating the plasticized gelatinous triblock elastomers directly into the polyurethane foam structure while the polyurethane foam is produced.

The reaction of the polyol/water and isocyanate to form polyurethane foam is exothermic, and the heat from this exothermic reaction at least partially melts the triblock copolymer resin. In one acceptable, non-limiting embodiment, the triblock copolymer resin is essentially completely polymerized prior to size reduction and incorporation into the mixture of open cell, flexible polyurethane foam-forming components, such as a mixture of at least one polyol and at least one isocyanate. The resulting combination may have a marbled, mottled or spotted appearance of the gel within the polyurethane foam.

In another non-limiting embodiment, the gel particles are added in the range of about 0.1 to about 200 parts per hundred of the polyol component of polyurethane foam. In an alternative, non-restrictive version, the gel particles are added in the range of about 5 independently to about 50 parts per hundred of the polyol component of polyurethane foam. By independently is meant that any lower threshold may be combined with any upper threshold for an effective range herein. Further, the gel particles may be added in the range of about 30 parts per hundred of the polyol component.

The addition of the gel elastomer changes the temperature properties of the combination with the foam in a measurable way. The gel has higher heat capacity than does the open cell, flexible polyurethane foam, and thus acts as a heat sink. The gel is an excellent conductor of heat, better relative to polyurethane foam, and thus in combination with the foam has the net effect of increasing the thermal conductivity of the gel-foam combination as compared to foam alone. When such a combination is used in bedding materials, such as mattresses and pillows, the two features combine to promote greater heat transfer and more comfortable sleep.

Since the gel is semi-liquid, it will deform, but not appreciably compress. Thus, a gel-foam matrix has the very unique property of a "Variable Support Factor". Support factor is defined by ASTM as the ratio of the 65% and 25% IFD values. For typical viscoelastic foam, this ratio is about 2.0. As the gel-foam combination described herein is compressed in small increments, the change in force required matches the underlying foam until enough compression occurs to cause the gel particles to contact one another. At this point, the gel-foam begins to act more like gel than foam and the resistance to compression increases. The point at which this transition occurs will vary with the content of gel in the gel-foam matrix. A higher loading of gel results in the gel particles interacting earlier in a compression cycle.

Polyurethane Component

As defined herein, the term polyurethane foam means polyether-based polyurethane foam or polyester-based polyurethane foam or a combination polyether and polyester polyurethane foam. As noted, polyurethane foam is commonly produced by methods of molding and free-rise. A common design for continuous free-rise processing equipment is the MAXFOAM machine, available from Beamech Group Limited. This type of machine, schematically illustrated in FIG. 1, uses a trough 12 where the chemicals are first introduced from a mixing head 14. The foam chemicals (including, but not necessarily limited to, polyol(s), water, silicone surfactant, catalyst, blowing agent(s), and isocyanate) stay in the trough 12 for about 10 to 25 seconds and then spill over the trough lip onto a series of fall-plates 16 leading to the main conveyor 18. The fall-plates 16, side-walls (not shown) and conveyor(s) 18 are protected from the reacting foam chemicals by a continuous film feed (bottom film, side films and additional films for block shaping; not shown in FIG. 1). Flexible polyurethane foam 20 is continuously produced by this technique.

Figure 2:
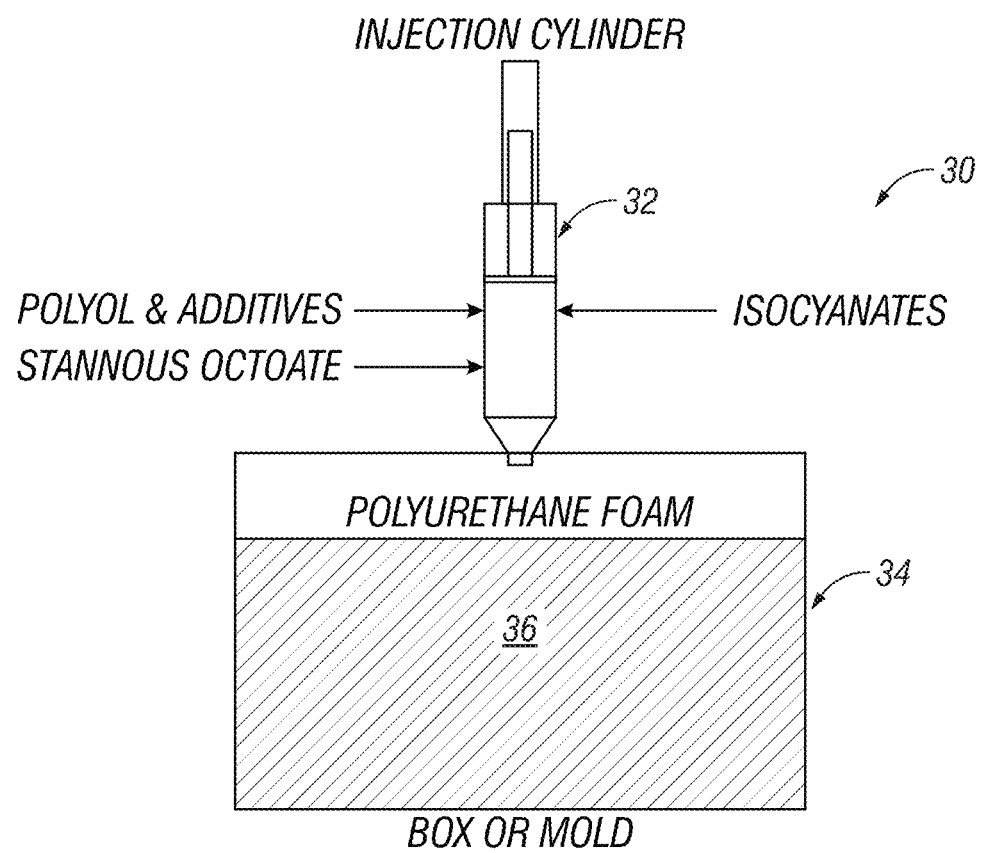
FIG. 2 is a schematic illustration of a box-pour machine for polyurethane foam.

Another common method of producing free-rise flexible foam is with a box-pour machine 30, as schematically illustrated in FIG. 2. This is a batch process whereby the foam chemicals are mixed and introduced in a variety of methods. These methods include but are not limited to the following: a mix-head or injection cylinder 32 using metered chemicals, manual or automatic addition by weight, reaction-injection-molding (RIM) and injection cylinders are known methods of introducing the chemicals into a container 34 (box, mold or cylinder). The containers are typically lined with cardboard or plastic film to facilitate removal of the foam 36.

It is believed that suitable open cell, flexible polyurethane foams are those conventional polyether and polyester polyurethane foams or a combination polyether and polyester polyurethane foam. The "hydroxyl number" for a polyol is a measure of the amount of reactive hydroxyl groups available for reaction. The value is reported as the number of milligrams of potassium hydroxide equivalent to the hydroxyl groups found in one gram of the sample. "Functionality" of a polyol is defined as the average number of hydroxyl groups per molecule.

The term "polyether polyol" includes linear and branched polyethers (having ether linkages) containing at least two hydroxyl groups, and includes polyoxyethylene polyether polyols, polyoxypropylene polyether polyols or mixed poly(oxyethylene/oxypropylene)polyether polyols. Generally, polyethers are the polyoxyalkylene polyols, particularly the linear and branched poly(oxyethylene) glycols, poly(oxypropylene)glycols and their copolymers. Other alkylene oxides besides ethylene oxide and propylene oxide may be used to produce suitable polyols. It will be appreciated that in the context herein the term "polyol" encompasses and includes "polymer polyols" as those are generally defined in the industry.

Polyols useful herein may have a functionality of 1.5 to 6.0 using single or mixed initiators including but not limited to glycerin (glycerol), trimethylolpropane (TMP), propylene glycol (PG), dipropylene glycol (DPG), ethylene glycol (EG), diethylene glycol (DEG), methylpropanediol (mpdiol), water, sucrose, D-sorbitol, glucoside, starch glycosides, aliphatic amines such as ethylenediamine (EDA), ethanolamine, diethanolamine (DEOA), triethanolamine, diisopropanolamine, erythritol, butane diol, hydrazine, low molecular weight adducts of polyfunctional amines, polyfunctional alcohols, aminoalcohols, alcoholamines and mixtures thereof, and aromatic amines such as aniline, toluene diamine, isomers of phenylene diamine, diethyl toluene diamine (DETA), pentaerythritol, isophorone diamine, 2,4,6-triaminotoluene, diethyltolylene diamine, and mixtures thereof, and the like. Polyol designs herein may have mixed, blocked or a combination of mixed and blocked ethylene oxide (EO) and mixed, blocked or a combination of mixed and blocked propylene oxide (PO), or may be based on natural sources or directly from natural sources such as soy-bean oil or castor-bean polyol.

The functionality or average functionality of a polyol should be taken into consideration in designing the proper foam formulation for producing polyurethane foam. In one non-limiting embodiment, the use of low functionality (about 2) polyol is useful for the production of viscoelastic foam. Where low functionality polyol(s) are used, a higher isocyanate index is generally required. The amount of isocyanate employed is frequently expressed by the term "index" which refers to the ratio of the total isocyanate used to the actual amount of isocyanate required for reaction with all of the active hydrogen-containing compounds present in the reaction mixture, multiplied by 100. For most foam applications, the isocyanate index is in the range from 60 to 140. An isocyanate index below 100 is typically used for viscoelastic foam, soft and super-soft conventional foam and soft or super-soft high resilient, or HR foam. A non-limiting embodiment is the use of viscoelastic foam as the carrier of the in-situ gel-foam. Open cell, flexible viscoelastic foam may be made using a wide range of polyols and isocyanates. For viscoelastic foam, polyol average functionalities typically range from about 2 to about 4, but may be higher in some cases and isocyanate functionalities range from about 2 to about 4, but may be higher in some cases. The isocyanate index used to produce viscoelastic foam is determined by the desired properties and the functionality and equivalent weights of the polyol(s) and isocyanate(s) used in the foam formulation. In one non-limiting embodiment, viscoelastic foam used in the production of gel-foam is made using a primary viscoelastic polyol with a functionality of about 3 and an equivalent weight of about 1000 and this is reacted with a blend of polymeric and di-functional MDI with an average functionality of about 2.3 at an index ranging from about 60 to about 90. The formation of an in-situ gel-foam introducing gel particles to polyurethane foam components for the co-formation of gel and foam is possible using very wide range of polyurethane foam types and formulations. The polyurethane foam formulations may include but are not limited to the use of polyether polyol(s) alone or in combination with polyester polyol(s), grafted copolymer polyol(s), polymer modifiers, cross-linkers, chain extenders and plasticizers. In one non-limiting embodiment, polyether polyol(s) are combined with polyester polyol(s) to achieve desired properties of the carrier foam. Many foam types were evaluated as carriers for in-situ gel-foam and it was discovered that the embodied methods of producing in-situ gel-foam may be applied to virtually any type of polyurethane foam, including but not limited to, conventional foams, viscoelastic foams, high resilient (HR) foams, polyester foams and polyether-polyester blend foams all ranging in density from about 0.5 pcf to about 10 pcf and ranging in hardness as measured by the ASTM 25% IFD from about 3 to about 300.

Catalysts are used to control the relative rates of water-isocyanate (gas-forming) and polyol-isocyanate (gelling) reactions. The catalyst may be a single component, or in most cases a mixture of two or more compounds. In one non-limiting embodiment, suitable catalysts for polyurethane foam production are organotin salts and tertiary amines, used singly or together. The amine catalysts are known to have a greater effect on the water-isocyanate reaction, whereas the organotin catalysts are known to have a greater effect on the polyol-isocyanate reaction. Total catalyst levels generally vary from 0 to about 5.0 parts by weight per 100 parts polyol. The amount of catalyst used depends upon the formulation employed and the type of catalyst, as known to those skilled in the art. Although various catalysts may be used in the methods herein, control of the gelling catalyst level is critical to producing foams with desired air permeability, which is a factor known to significantly affect foam cushioning performance. The following ranges of catalyst amounts may be satisfactory: amine catalyst from 0 to 2 parts per 100 parts polyol; and organotin catalyst from 0 to 0.5 parts per 100 parts polyol.

One or more surfactants may also be employed in the foam-forming composition. The surfactants lower the bulk surface tension, promote nucleation of cells or bubbles, stabilize the rising cellular structure and emulsify incompatible ingredients. The surfactants typically used in polyurethane foam applications are polysiloxane-polyoxyalkylene copolymers, which may generally be used at levels between about 0.5 and 3 parts by weight per 100 parts polyol. In the methods and compositions herein, from 0 to 2 parts by weight per 100 parts polyol of surfactant may be used, and alternatively 1 part by weight per 100 parts polyol.

A blowing agent may be included in the foam-forming composition. A common blowing agent is water that may be added in amounts from about 0.1 to 7 parts per hundred parts polyol. Water acts as a blowing agent when it reacts with isocyanates and produces carbon dioxide, which expands the foam. In one non-limiting embodiment, water as a blowing agent is added in an amount suitable to achieve a desired foam density. Other blowing agents known as auxiliary blowing agents can be used in combination with water. However, the auxiliary blowing agent is not reacted in the foam matrix but instead acts as an inert expansion gas.

Cross-linking or chain-extending additives may be included in the foam-forming composition to enhance processing, physical properties, and foam stability. Typically, cross-linking or chain extending additives are relatively small molecules containing 2 to 6 active hydrogen groups, or primary or secondary amine groups, and are added in amounts from 0 to 10 parts per hundred parts polyol. Optional, representative cross-linking or chain-extending additives include, but are not necessarily limited to, diethanolamine (DEOA), ethylene glycol (EG), diethylene glycol (DEG), propylene glycol (PG), dipropylene glycol (DPG), 1,4-butanediol (BDO), methyl-propane diol, glycerin and short chain difunctional and polyfunctional polyether or polyester polyols. In one optional, non-restrictive embodiment, the cross-linking additives are included in amounts from 0.2 to 5.0 parts per hundred parts polyol. Alternatively however, the methods and compositions herein may be practiced in the absence of a chain extender or cross-linking additives.

Optionally, other additives may be incorporated into the foam-forming composition. The optional additives include, but are not limited to, flame retardants, stabilizers, antimicrobial compounds, extender oils, dyes, pigments, and antistatic agents.

The open cell, flexible, viscoelastic foam described herein may be produced under pressure or under vacuum using batch processes or continuous processes. Pressure can be applied by platens or conveyors which compress the foam while the foam is not fully cured. Alternatively, the method is practiced under atmospheric pressure, in the regime of atmospheric pressure to greater than atmospheric pressure, or in the regime of atmospheric pressure to less than atmospheric pressure. The process may be a free rise process or may involve a mold as previously described.

Latex-Based Gel-Foam

It is expected that open cell, flexible latex foam could be used in place of or in addition to polyurethane foam in combination with plasticized triblock copolymer gels to form unique latex gel-foam. One process used for open cell, flexible latex foam production involves introducing air into the latex, e.g. whipping or beating warm natural or synthetic latex in the presence of additives to promote open cell formation, stabilization and curing. The additives may include, but not necessarily be limited to, foam stabilizers, foam promoters, zinc oxide delayed action gelling agents and combinations thereof. A final step in this process is to cure the foam with heat. With the addition of gel particles to the latex foam process, the heat applied to whip and cure the foam would also serve to partially or fully crosslink the gel particles forming an integrated in situ open cell, flexible latex gel-foam.

Plasticized Elastomer Component

Plasticized triblock copolymer gels may be produced from high viscosity triblock copolymers and optionally with diblock copolymers that have been melted or mixed with a plasticizing agent, such as mineral oil, synthetic oil, etc., and optionally mixed with additives such as colorants, polyols, etc. In other words, one non-limiting embodiment of the method involves gel particles (in a non-limiting example, a plasticized triblock gel polymer) that is made in the form of flowable or "fluffy" solid, which if heated sufficiently, would form a gel that is added to the polyurethane foam components to produce the gel-foam. In almost all cases it is expected that the foaming reaction generates sufficient heat to melt the gel particles in the polyurethane foam. There may be cases where there is insufficient exothermic temperature to melt the gel particles completely in the foam. The resulting gel particles/foam would still have desirable properties, but the look and feel of the gel particles/foam would be expected to be different.

Triblock copolymers include, but are not necessarily limited to, (SB)n styrene-butadiene, (SEB)n, (SIS) styrene-isoprene-styrene block copolymers, (SEBS) styrene-ethylene-butylene-styrene block copolymers, (SEP) styrene-ethylene-propylene block copolymers, (SEEPS) styrene-ethylene-ethylene-propylene-styrene block copolymers, (SBS) styrene-butadiene-styrene block copolymers and the like. The term "n" here and elsewhere refers to the number of repeating polymer units. The triblock copolymers employed in the gel may have the more general configuration of A-B-A. The A component represents a crystalline polymer end block segment of polystyrene; and the B component represents an elastomeric polymer center block segment. These "A" and "B" designations are only intended to reflect conventional block segment designations. Elastomeric and polystyrene portions are incompatible and form a two-phase system consisting of sub-micron domains of glassy polystyrene interconnected by flexible elastomeric chains. These two discrete domains act as hard and soft block segments which help crosslink and reinforce the plasticized gelatinous triblock copolymer. This physical elastomeric network structure is reversible, and heating the polymer above the softening point of polystyrene temporarily disrupts the structure, which can be restored by lowering the temperature below the softening point again. It may thus be understood that the copolymer resin or gel particle is optionally at least partially crosslinked before, during or after introduction into the mixture of polyurethane foam forming components. As noted, heating the copolymer resin via heat produced by the reaction of the polyol and the polyisocyanate may partially or completely crosslink the copolymer resin or gel particle. By "completely crosslink", it is meant that crosslinking has occurred to the maximum extent. However, it will be appreciated that it is not necessary to completely crosslink the gel particle when it is reacted to form a gelatinous elastomer. That is, a successful product may result if the gelatinous elastomer is only partially crosslinked. Even if the gel particle was fully or completely crosslinked, it is expected that the exothermic foam reactions would cause the gel to rearrange bonds and/or become physically attached to the foam, and in some cases chemically attached to the polyurethane components when active hydrogen components, such as polyols, are used as a plasticizer alone or in combination with one or more non-active hydrogen plasticizers or are used as a carrier in the gel or gel particle. In the case where active hydrogen compounds are used, it would be expected that all or a portion of the active hydrogens would react with polyisocyanate forming linkages with the polyurea, polyurethane and other components of the polyurethane foam.

In one non-limiting embodiment, the gel or gel particle is completely cured prior to addition to the polyurethane foam forming components. In this embodiment, a finished crosslinked gel is ground or cut into granules or a powder and then added into the foam during production of the foam. There are many techniques and methods for reducing the size of the gelled polymer and this embodiment is not limited to any particular size-reduction technique. In another non-restrictive version, the finished gel, which may or may not be crosslinked, is a relatively very fine grind (for instance particles having an average particle size of about 10 millimeters or less, alternatively 2 millimeters or less, so that it may be dispersed in the foam to give a better feel and to avoid the possibility of separating from the foam forming components during the foaming reaction. The ground particles may have an average volume of between about 0.001 independently to about 1000 mm$^3$, in another non-limiting version of between about 0.005 inde-pendently to about 125 mm$^3$, alternatively between about 0.01 independently to about 8 mm$^3$.

Diblock copolymers of the general configuration A-B may also be used alone or together with A-B-A triblock copolymers. Diblock copolymers are typically used to modify the properties of a triblock copolymer. The monomers suitable for use in diblock copolymers may be the same as those used in the triblock copolymers noted above.

Examples of copolymers that may be used to achieve one or more of the novel properties herein are styrene-ethylene-butylene-styrene block copolymers (SEBS) under trade designations KRATON G1650, KRATON G 1651, KRATON G1652, and other like A-B-A triblock copolymers available from Kraton Performance Polymers. Other examples of suitable triblock copolymer resins are available from Dynasol under trade designation of CH-6110 and CH-6174.

Other grades of (SEBS) polymers may also be utilized herein provided such SEBS polymers exhibit the required properties. The styrene to ethylene and butylene weight ratio of SEBS useful in forming the gelatinous elastomer may range from lower than about 20:80 to above about 40:60. Typical ratio values for KRATON G1650, KRATON G 1651, KRATON G1652 are approximately about 30:70 to 33:67. These ratios may vary broadly from the typical product specification values.

Plasticizers suitable for making acceptable gels are well known in the art, they include, but are not necessarily limited to, rubber processing oils such as paraffinic and naphthenic petroleum oils, highly refined aromatic-free paraffinic and naphthenic food and technical grade white petroleum mineral oils, synthetic oils and natural oils and polyols made from natural oils and natural polyols. Synthetic oils are high viscosity oligomers such as non-olefins, isoparaffins, paraffins, aryl and/or alkyl phosphate esters, aryl and/or alkyl phosphite esters, polyols, and glycols. Many such oils are known and commercially available. Examples of various commercially available oils include, but are not necessarily limited to, PAROL® and TUFFLO® oils. Natural oils such as, but not limited to, canola oil, safflower oil, sunflower oil, soybean oil, and/or castor oils may be used. Natural oil-based polyols are biologically-based polyols such as, but not limited to, soybean-based and/or castor bean polyols. The value of using polyols as plasticizers alone or together with other plasticizers is to provide the potential for chemical bonding of the gel particles with the polyurethane foam rather than just the physical bonding that occurs with non-reactive plasticizers such as paraffinic or naphthenic mineral oils. This is because the polyols have active hydrogens. One advantage of using polyols as plasticizers or co-plasticizers is that the final combined gel-foam may be less tacky and/or stronger than combined gel-foams made only with non-reactive plasticizers in the plasticized copolymer resin. The plasticizers described herein may also serve as carriers for modifying additives introduced into the gel or gel particles, such as phase transition additives, i.e. carriers to move an additive within the gel or gel particles and carriers used to transport an additive within the gel or gel particles. The plasticizer constitutes about 1 independently to about 1,400 pph (parts per hundred parts of triblock copolymer resin) and alternatively about 200 independently to about 800 pph (parts per hundred parts of triblock copolymer resin), in a gel suitable for in-situ polyurethane foaming is obtained.

The gel may also contain useful amounts of conventionally employed additives such as stabilizers, antioxidants, antistatic agents, antimicrobial agents, ultraviolet stabilizers, phase change materials, surface tension modifiers such as silicone surfactants, emulsifying agents, and/or other surfactants, grafting polyols, compatible hydroxyl-containing chemicals which are completely saturated or unsaturated in one or more sites, solid or liquid fillers, antiblocking agents, colorants such as inorganic colorants, carbon black, organic colorants or dyes, reactive organic colorants or dyes, fragrances, solid or liquid flame retardants, other polymers in minor amounts and the like to an extent not affecting or substantially decreasing the desired properties of the combination of gelatinous elastomer and polyurethane foam herein. Minor amounts of other polymers and copolymers may be melt-blended with the styrene-ethylene-butylene-styrene block copolymers mentioned above without substantially decreasing the desired properties. Colorants may be added as is, or may be covalently reacted on the copolymer backbone or fixed by pre-reacting, grafting, mechanical or chemical bonding compounds on the copolymer backbone and then fixing or bonding the color or dye on the grafted compound. Various organic molecules may be used for this purpose including, but not necessarily limited to, Milliken Polyurethane Dyes, Rebus pigments and dyes, and RYVEC pigments. The colorant is present in an amount up to about 50 parts per hundred of the A-B-A triblock copolymer. Alternatively, the colorant is used in the range of up to 2 pph of A-B-A triblock copolymer. The gel may also be coated or premixed with detackifying agents, such as melamine, calcium stearate, talc, and mixtures thereof, but not limited to the previously mentioned examples.

Gel Preparation

The plasticized triblock copolymer gel that is suitable for use in polyurethane foams may be prepared by a method or methods including batch-wise or continuous mixing in a mixer, rotating vessel, ribbon blender, paddle blender, plough blender, plastic screw, or any other equipment known in the art of skill that is used for mixing solids with additives.

Alternatively, the plasticized gel may be prepared by mixing continuously in a mixer/auger system. A-B-A triblock copolymer resin, optional solvent, colorant, and plasticizer may be added and mixed with an auger with or without heat to produce a plasticized gel suitable for incorporation into polyurethane foam upon exiting the mixer/auger system.

Alternatively, the plasticized gel may be prepared by adding all of the necessary ingredients into a plastic screw and melt blending and/or extruding the melt mixture into a mold or through a screen that has rotating blades/knives which cut the extruded pieces into fine particles. These fine plasticized gel particles may be coated with an organic powder such as melamine, an inorganic powder such as talc or fumed silica, or an oil to inhibit or prevent the particles from sticking together. Alternatively, the un-plasticized resin or plasticized gel particle may be cryogenically ground by using liquid or solid carbon dioxide, liquid nitrogen, or any other suitable cryogenic liquid to cool down the plastic to make the particle more brittle and able to grind to a controllable size. If carbon dioxide is used, the grinding temperature can be as low as −110° F. (−79° C.). If liquid nitrogen is used, the grinding temperature can be as low as −321° F. (−196° C.).

The A-B-A triblock copolymer resin may be mixed with a plasticizer, optional solvent, colorant, or additives at a temperature between about −10° F. to about 400° F. (about −23° C. to about 204° C.) and at a pressure from full vacuum to 20 atm (2 MPa).

One suitable method of making plasticized copolymer gel is by mixing the A-B-A triblock copolymer resin with a colorant. The colorant and compatible solvent may also be premixed to aid in dispersing the colorant throughout the resin. Other methods of dispersing the colorant may be by heating the colorant and/or resin to reduce viscosity by temperature or reducing viscosity in a compatible inert carrier. Suitable inert carriers include, but are not necessarily limited to, non-polar carriers, polar carriers, polyether polyol carriers, polyester polyol carriers, isocyanate/polyether prepolymers, liquid or solid fillers, liquid or solid flame retardants, water, and/or blowing agents. Another method is to use an A-B-A triblock copolymer with the desired color already compounded in or fixed on the triblock copolymer elastomer. After the colorant has adequately coated the resin, an optional solvent and plasticizer is/are added in the required weight ratio relative to the resin. Suitable solvents include, but are not necessarily limited to, the following examples: saturated acyclic aliphatic hydrocarbons, unsaturated acyclic aliphatic hydrocarbons, saturated cyclic aliphatic hydrocarbons, unsaturated cyclic aliphatic hydrocarbons, aromatic hydrocarbons, chlorinated hydrocarbons, alcohols, glycol ethers, ketones, aldehydes, epoxides, carboxylic acids, esters, glycol ether esters, fatty acids, phosphite esters, phosphate esters, dimethylsulfoxide, dimethylformamide, hexamethylphosphorotriamide, furan, water, methylene chloride, toluene, acetone and combinations thereof. The solvent may be added in the range of from about 1 to about 500 parts of triblock copolymer resin. The solvent can be added to soften or melt some of the polystyrene units to swell the resin so the plasticizer can migrate into the resin more quickly. The solvent also aids in dispersing the colorant and helping the colorant to penetrate the resin and to help reduce colorant or dye leaching in the final product. The solvent may remain in the gel or be evaporated from the gel or resin after colorant penetration or plasticizer addition. One suitable method is to remove the solvent prior to dispersing the prepared plasticized copolymer gel particles in the polyol blend. Heating alone or in combination with solvent will also help in the plasticizer penetration into the A-B-A triblock copolymer resin. Heating the final gel product increases the evaporation rate of the solvent from the gel. Heating the unplasticized resin or plasticized resin also helps in fixing the colorant to reduce leaching and migration of color away from the plasticized gel. One suitable but non-limiting embodiment for coloration of the ABA triblock copolymer resin is to add dye using water as a solvent, then after thorough mixing; the water is evaporated leaving the dye as a coating and in some cases penetrating the ABA triblock copolymer resin. The evaporation techniques may include, but are not limited to the use of heated air, vacuum, heated chamber, infrared heating or combinations thereof.

Figure 3:
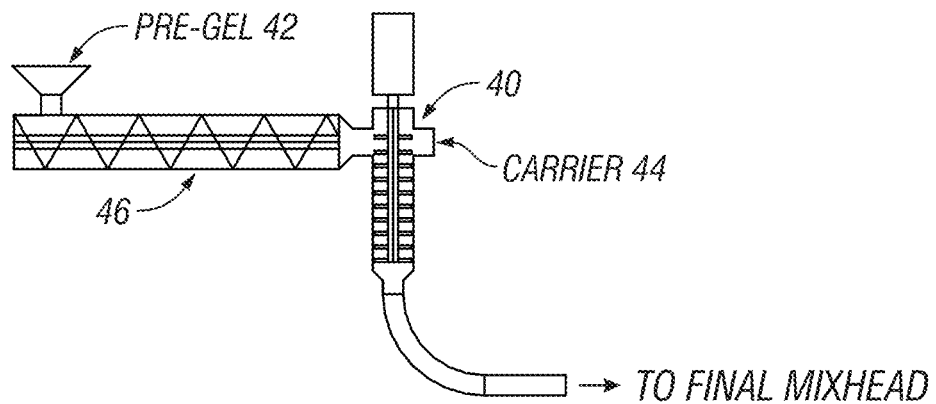
FIG. 3 is a schematic illustration of an auger mixing system for plasticized gelatinous copolymer particles and polyol.
Figure 4:
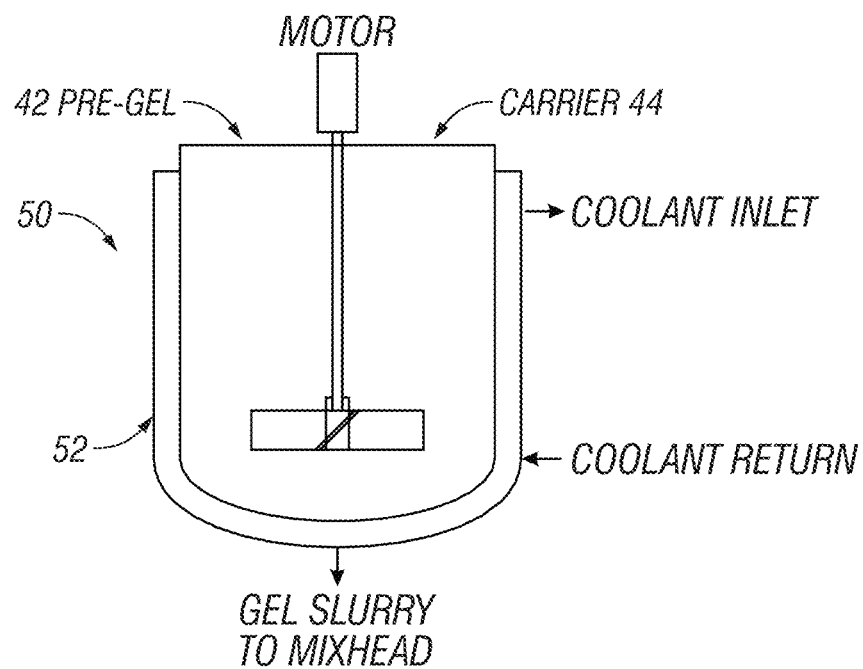
FIG. 4 is a schematic illustration of a mixing system for plasticized gelatinous copolymer particles and polyol.

One method of adding gel particles to the compatible carrier is by augering the gel particles 42 into a mix chamber 40 using auger 46, as schematically illustrated in FIG. 3, where the gel particles 42 and compatible carrier 44 are mixed prior to adding other chemicals required to make polyurethane foam. Alternatively, mixing may be performed directly into the main mix head or can be mixed in a separate mix head and the gel particles and compatible carrier mixture fed into the main mix head with the other formulation components. Another non-restrictive method may be to use the auger to mix the gel particles 42 and compatible carrier together while augering to the main mix head. Another non-limiting embodiment of adding gel particles 42 to the compatible carrier 44 is by adding the gel particles into a compatible carrier in a mix tank 50, as schematically illustrated in FIG. 4. A typical mix tank 50 may have a heating/cooling jacket 52 for controlling the temperature within the tank. The carrier is added to the mixing tank and then the gel particles 42 is mixed into the carrier while agitating. While mixing, the gel particles 42 may be added to the tank gradually or all at once. Alternatively, the gel particles 42 may be added to the mixing tank first and then the compatible carrier added to the tank while mixing. It will be appreciated that the method described herein is not limited to these two examples, since there are many combinations for combining gel particles with a compatible carrier before incorporating gel particles into final polyurethane foam.

Applications of the Combined Gel Elastomer and Polyurethane Foams

The list below shows some, but not all, of the applicable uses of the combination of gelatinous elastomer and open cell flexible polyurethane foam or latex foam produced by the methods herein.
1. Mattresses, pillows, and bed-top products;
2. General furnishings and Upholstered furniture including cushions, armrests, seat-backs, foot-rests, decorative cushioning and functional support.
3. Rebond carpet pad or use as a floor mat (rebond carpet pad uses recycled foam to create the pad that goes under carpet, giving a cushioned feel and extra life to the carpet);
4. Use as a shoe insert foamed in-situ with energy absorption foam, viscoelastic foam or other foam;
5. Use in medical applications such as wheelchair seat cushions and backs, orthopedic shoes, hospital beds, gurney pads, medical bed pads, medical supports and cushioning;
6. Use in conventional polyether polyurethane foams, high resilient polyether polyurethane foams, viscoelastic polyether polyurethane foams, semi-rigid polyether polyurethane foams, rigid polyether polyurethane foams, polyester polyurethane foams, combined polyether-polyester foam or latex foam for general cushioning, energy absorption, packaging, sealants and fillers; and
7. Seat cushions, seat backs, headrests and armrests of chairs and seats for application in vehicles such as automobiles, motorcycles, bicycles, buses, aircraft, watercraft, tractors and other agricultural equipment such as combines, construction equipment and utility vehicles.

One suitable application of the methods and compositions herein includes incorporating the triblock copolymer gel in viscoelastic polyurethane foam. The triblock copolymer gel, optionally in combination with a carrier, may be added to the unreacted polyurethane components and incorporated in the open cell, flexible viscoelastic polyurethane foam. Adding triblock copolymer gel to viscoelastic polyurethane gel may result in higher support factors, higher thermal conductivity, and higher heat capacity.

The flexible polyurethane foams or latex foams with the in-situ formed gelatinous elastomer described herein may find utility in a very wide variety of applications. More specifically and other in non-limiting embodiments, the combined polymers would be suitable as pillows or pillow components, including, but not necessarily limited to, pillow wraps or shells, pillow cores, pillow toppers, for the production of medical comfort pads, medical mattresses and similar comfort and support products, and residential/consumer mattresses mattress toppers, and similar comfort and support products, typically produced with conventional flexible polyurethane foam or fiber. All of these uses and applications are defined herein as "bedding products". Alternatively, the combination in-situ formed gelatinous elastomer/open cell flexible polyurethane foams described herein are expected to be useful for the production of upholstered furniture to replace conventional foam, polyester fiber or other support materials. Examples of these applications include but are not limited to upholstered chair backs, head-rests, foot-rests, arm-rests, neck supports, quilting support and cushioning and the like and combinations thereof. All of these latter uses and applications are defined herein as "furniture upholstery".

The invention will now be described more specifically with respect to particular formulations, methods and compositions herein to further illustrate the invention, but which examples are not intended to limit the methods and compositions herein in any way. Table 1 and 2 presents sixteen formulation examples of open cell polyurethane flexible foams made according to the methods described herein. Foam properties are presented in the lower portion of Tables 1 and 2. The component definitions and plasticized gelatinous triblock polymer descriptions are given in Table 3.

TABLE 1

FORMULATION EXAMPLES - POLYURETHANE FLEXIBLE FOAMS

| | | Sample # | | | | | | | |
|---|---|---|---|---|---|---|---|---|---|
| | Units | 5504 | 5513 | 6051 | 6052 | 6053 | 6054 | 6057 | 6058 |
| X-48 | pph | 100 | | | | | | | |
| X-49 | pph | | 100 | | | | | | |
| X-50 | pph | | | 100 | 100 | 100 | 100 | 100 | 100 |
| Water Total | pph | 1.77 | 1.82 | 2.25 | 2.25 | 2.25 | 2.25 | 2.25 | 2.25 |
| L-618 | pph | 0.8 | 0.8 | 1.4 | 1.4 | 1.4 | 1.4 | 1.4 | 1.4 |
| A-133 | pph | 0.5 | | | | | | | |
| ZF-10 | pph | | 0.1 | 0.16 | 0.16 | 0.16 | 0.16 | 0.16 | 0.16 |
| T-Cat 110 | pph | 0.08 | 0.06 | 0.10 | 0.10 | 0.10 | 0.10 | 0.10 | 0.10 |
| Gel #14 | pph | 30.0 | | | | | | | |
| Gel #18 | pph | | 30.0 | | | | | | |
| Gel #24 | pph | | | | 30.0 | | | 30.0 | |
| Gel #25 | pph | | | | | 30.0 | | | |
| Gel #26 | pph | | | | | | 30.0 | | |
| Gel #27 | pph | | | | | | | | 30.0 |
| MDI | pph | 48.2 | 46.88 | 47.72 | 47.72 | 47.72 | 47.72 | 47.72 | 47.72 |

TABLE 1-continued

FORMULATION EXAMPLES - POLYURETHANE FLEXIBLE FOAMS

| | Units | 5504 | 5513 | 6051 | 6052 | 6053 | 6054 | 6057 | 6058 |
|---|---|---|---|---|---|---|---|---|---|
| Cream Time | sec | 21 | 40 | 24 | 26 | 26 | 26 | 26 | 25 |
| Rise Time | sec | 127 | 200 | 129 | 166 | 170 | 175 | 173 | 173 |
| Settle | inches | 0 | 0 | 0 | 0 | 0 | 0 | 0 | 0 |
| Density | pcf | 4.56 | 5.05 | 3.11 | 3.98 | 3.97 | 3.96 | 3.96 | 3.96 |
| Airflow[1] | SCFM | 2.9 | 3.4 | 3.6 | 3.8 | 4.8 | 4.9 | 4.2 | 4.6 |
| 25% IFD[2] | Lbf/50 in$^2$ | 6.2 | 19.1 | 12.3 | 10.4 | 7.6 | 7.8 | 8.4 | 8.3 |

[1] Airflow: ASTM D 3574 G
[2] 25% IFD: ASTM D 3574 B

TABLE 2

FORMULATION EXAMPLES - POLYURETHANE FLEXIBLE FOAMS

| | Units | 6702 | 6703 | 6704 | 6705 | 6706 | 6707 | 6708 | 6709 |
|---|---|---|---|---|---|---|---|---|---|
| X-51 | pph | 100 | 100 | 100 | 100 | 100 | 100 | 100 | 100 |
| Water Total | pph | 2.10 | 2.10 | 2.10 | 2.10 | 2.10 | 2.10 | 2.10 | 2.10 |
| L-618 | pph | 1.20 | 1.20 | 1.20 | 1.20 | 1.20 | 1.20 | 1.20 | 1.20 |
| ZF-10 | pph | 0.20 | 0.20 | 0.20 | 0.20 | 0.20 | 0.20 | 0.20 | 0.20 |
| T-Cat 110 | pph | 0.12 | 0.12 | 0.12 | 0.12 | 0.12 | 0.12 | 0.12 | 0.12 |
| Gel #30 | pph | 30.0 | | | | | | | |
| Gel #31 | pph | | 30.0 | | | | | | |
| Gel #32 | pph | | | 30.0 | | | | | |
| Gel #33 | pph | | | | 30.0 | | | | |
| Gel #34 | pph | | | | | 30.0 | | | |
| Gel #35 | pph | | | | | | 30.0 | | |
| Gel #36 | pph | | | | | | | 30.0 | |
| Gel #37 | pph | | | | | | | | 30.0 |
| MDI | pph | 47.8 | 47.8 | 47.8 | 47.8 | 47.8 | 47.8 | 47.8 | 47.8 |
| Cream Time | sec | 21 | 22 | 22 | 20 | 22 | 28 | 22 | 23 |
| Rise Time | sec | 148 | 156 | 161 | 155 | 158 | 257 | 140 | 155 |
| Settle | inches | 0 | 0 | 0 | 0 | 0 | 2 | 0 | 0 |
| Density | pcf | 4.15 | 4.27 | 4.21 | 4.34 | 4.23 | 5.21 | 4.16 | 4.34 |
| Airflow[1] | SCFM | 2.8 | 3.5 | 4.0 | 3.5 | 3.9 | 8.7 | 2.6 | 4.1 |
| 25% IFD[2] | Lbf/50 in$^2$ | 21.0 | 16.1 | 14.1 | 13.9 | 13.9 | 5.3 | 23.2 | 14.9 |

[1] Airflow: ASTM D 3574 G
[2] 25% IFD: ASTM D 3574 B

TABLE 3

COMPONENT DEFINITIONS

| | |
|---|---|
| X-48 | Polyol Blend from Peterson Chemical Technology, OH 169.7 |
| X-49 | Polyol Blend from Peterson Chemical Technology, OH 157.3 |
| X-50 | Polyol Blend from Peterson Chemical Technology, OH 148.4 |
| X-51 | Polyol Blend from Peterson Chemical Technology, OH 145.6 |
| F3222 | 3200 MW Conventional Polyol from Bayer, 52.0 OH |
| A-133 | 23% bis(dimethylaminoethyl)ether in 3000 MW polyol |
| ZF-10 | Reactive catalyst available from Huntsman Chemicals |
| L-618 | Silicone surfactant available from Momentive Performance Materials |
| MDI | Polymeric MDI having a NCO content of about 32.6% with an average functionality of about 2.4 |
| T-Cat 110 | Stannous octoate catalyst available from Gulbrandsen Chemicals |

Gel #14 (Plasticized Gelatinous Triblock Copolymer)

Add 82.47 grams Kraton G1651H
Add 1.03 grams Milliken X17AB
Add 45.91 grams Acetone
Evaporated to 1.12 gram acetone
Added 372.22 grams of hydrogenated paraffinic oil Gel #18 (Plasticized Gelatinous Triblock Copolymer)

Add 100.44 grams Kraton G1651H
Add 1.14 grams Milliken X17AB
Add 55.9 grams Acetone
Add 446.80 grams of hydrogenated paraffinic oil
Evaporated acetone Gel #24 (Plasticized Gelatinous Triblock Copolymer)

Add 174.15 grams Kraton E1830
Add 1.99 grams Milliken X17AB
Add 35.51 grams Acetone
Add 530.5 grams of hydrogenated paraffinic oil
Evaporated acetone Gel #25 (Plasticized Gelatinous Triblock Copolymer)

Add 132.67 grams Kraton G1651H
Add 1.53 grams Milliken X17AB
Add 27.44 grams Acetone TABLE 3-continued

COMPONENT DEFINITIONS

Add 577.73 grams of hydrogenated paraffinic oil
Evaporated acetone
Gel #26 (Plasticized Gelatinous Triblock Copolymer)

Add 132.85 grams Kraton E1830
Add 1.57 grams Milliken X17AB
Add 40.06 grams Acetone
Add 581.92 grams of hydrogenated paraffinic oil
Evaporated acetone
Gel #27 (Plasticized Gelatinous Triblock Copolymer)

Add 132.01 grams Kraton E1830
Add 1.55 grams Milliken X17AB
Add 52.8 grams Acetone
Add 578.34 grams of hydrogenated paraffinic oil
Evaporated acetone
Gel #30 (Plasticized Gelatinous Triblock Copolymer)

Add 130.5 grams of Kraton G1651H
Add 68.95 grams of Water-based dye
Evaporate water away at 230 deg F.
Add 559.7 grams of hydrogenated paraffinic oil
Mix
Gel #31 (Plasticized Gelatinous Triblock Copolymer)

Add 130.6 grams of Kraton G1651H
Add 34.5 grams of Colorant (low-water dye)
Evaporate water away at 230 deg F.
Add 561.1 grams of hydrogenated paraffinic oil
Mix
Gel #32 (Plasticized Gelatinous Triblock Copolymer)

Add 130.6 grams of Kraton G1651H
Add 30.4 grams of Colorant (low-water dye with fixing additive)
Evaporate water away at 230 deg F.
Add 561.1 grams of hydrogenated paraffinic oil
Mix
Gel #33 (Plasticized Gelatinous Triblock Copolymer)

Add 130.6 grams of Kraton G1651H
Add 27.2 grams of Colorant (no-water dye)
Evaporate water away at 230 deg F.
Add 561.1 grams of hydrogenated paraffinic oil
Mix
Gel #34 (Plasticized Gelatinous Triblock Copolymer)

Add 48.83 grams of Kraton G1651H
Add 25.88 grams of Water-based dye
Evaporate water away at 230 deg F.
Add 6.45 grams of Soybean-based polyol and 208.6 grams of hydrogenated paraffinic oil
Mix
Gel #35 (Plasticized Gelatinous Triblock Copolymer)

Add 48.83 grams of Kraton G1651H
Add 25.88 grams of Water-based dye
Evaporate water away at 230 deg F.
Add 43.0 grams of Canola Oil and 172.0 grams of hydrogenated paraffinic oil
Mix
Gel #36 (Plasticized Gelatinous Triblock Copolymer)

Add 48.83 grams of Kraton G1651H
Add 25.88 grams of Water-based dye
Evaporate water away at 230 deg F.
Add 215.0 grams of hydrogenated paraffinic oil
Mix
Gel #37 (Plasticized Gelatinous Triblock Copolymer)

Figure 5:
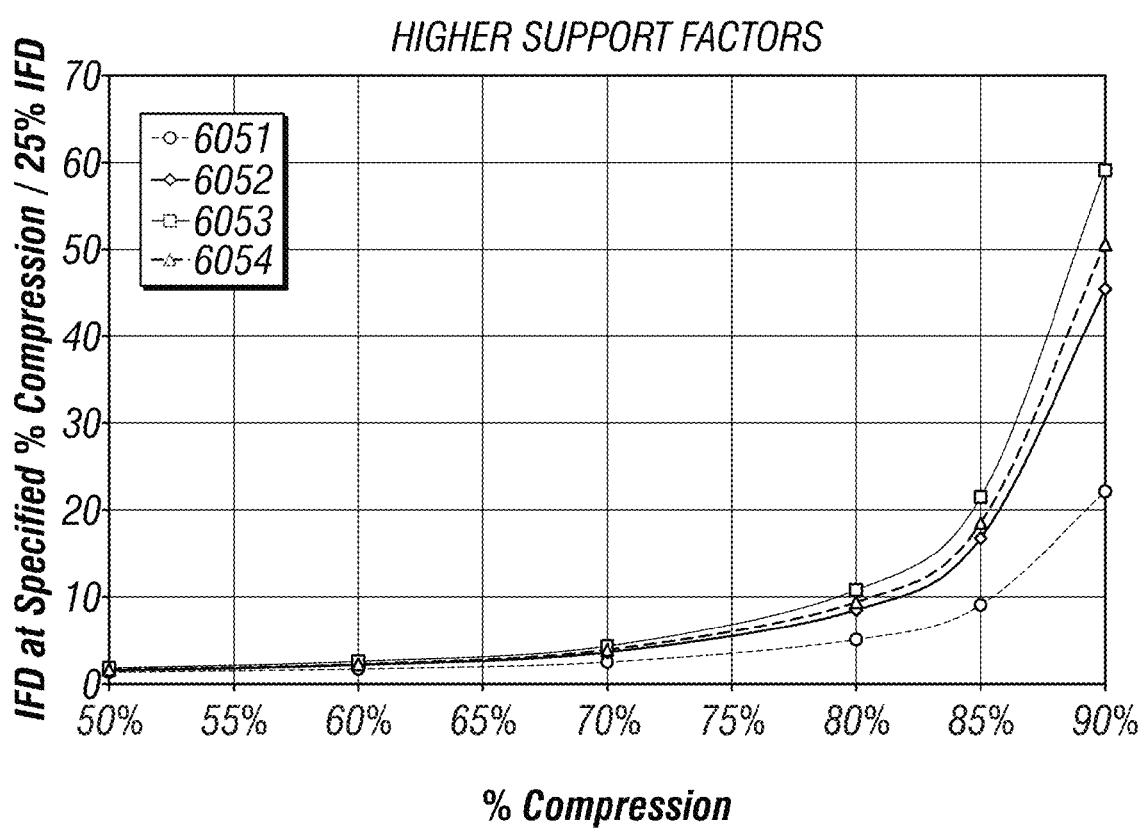
FIG. 5 is a graph of higher support factors at a compression greater than 50% plotting the ratio of IFD at specified % Compression relative to 25% IFD as a function of % Compression.
Figure 6:
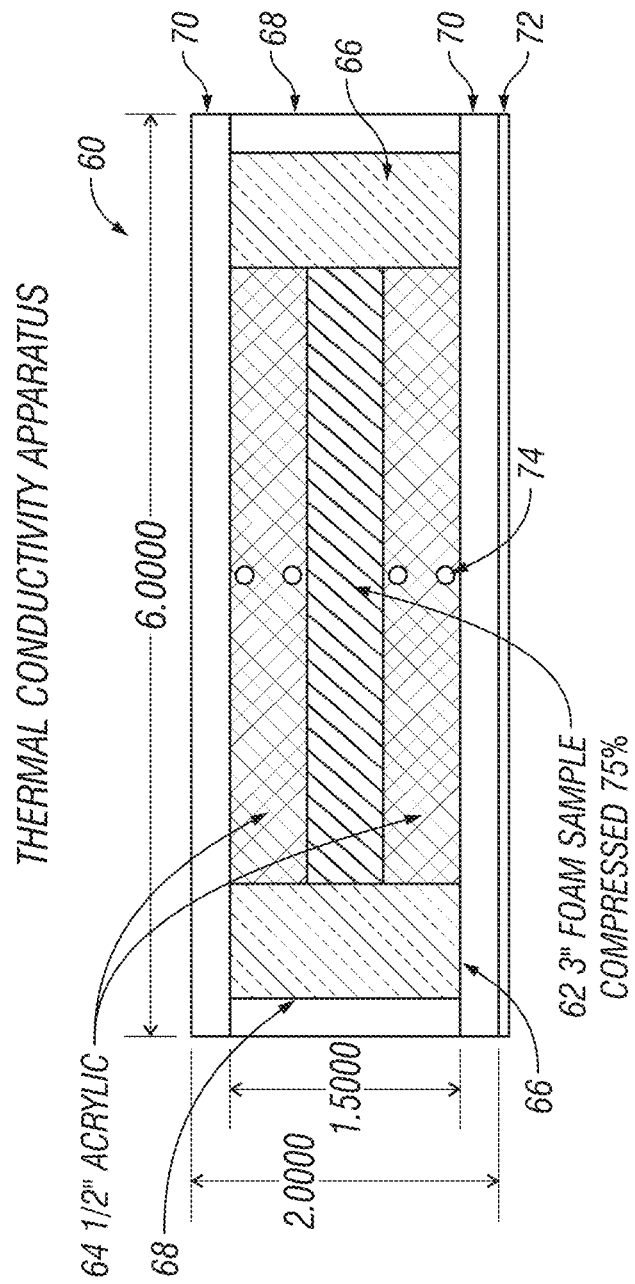
FIG. 6 is a schematic illustration of a thermal conductivity test apparatus.
Figure 7:
FIG. 7 is a photograph of an inventive white, soft open cell commodity viscoelastic flexible polyurethane foam having heterogeneously distributed gel particles.
Figure 8:
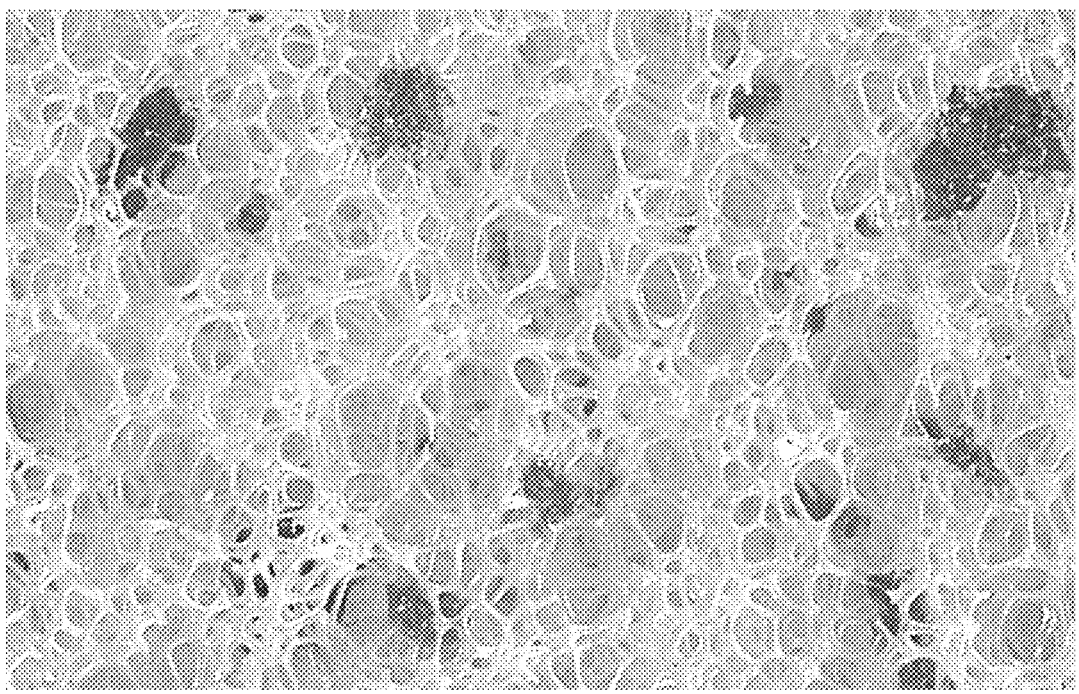
FIG. 8 is a microphotograph from one of the inventors' customers of a combination gelatinous elastomer-infused open cell flexible viscoelastic polyurethane foam.

Add 48.83 grams of Kraton G1651H
Add 25.88 grams of Water-based dye
Evaporate water away at 230 deg F.
Add 37.6 grams of X28 (phase change additive from Peterson Chemical Technology) and 177.4 grams of hydrogenated paraffinic oil
Mix Higher Support Factors One advantage of the method described herein in producing open cell flexible foam is that it gives the foam higher support factors than a foam without the triblock copolymer elastomer. A sample with dimensions of 4" wide×7.25" long×2" high was compressed on an IFD instrument. The sample was tested at 25%, 40%, 50%, 60%, 70%, 80%, 85%, 90% and 90% compression. At each compression setting, the force was allowed to relax for 60 seconds before the force was recorded. Table 4 shows the compression forces for each compression percentage exhibited by four foam samples reported in Table 1. FIG. 5 shows the data graphically. The control sample 6051 without any gelatinous elastomer had a support factor of 1.95 at 65% compression relative to 25% compression. The gel-containing Viscoelastic foams had support factors considerably above this. For non-gel polyurethane foam, the 65%-to-25% support factor is typically in the range of 1.9-2.2. With 30 pph of gel added, the support factor increased to 2.6-3.1 for the 65% compression relative to 25% compression. The rate of change of the force required to compress gel-foam as a function of the percent compression is relative to the parts of gel per hundred parts of Polyol (pph) used in the in-situ gel-foam formulation. Increasing the loading of gel in gel-foam will generally increase the rate of change of support factor ($\Delta SF \propto dF/dC$, where SF=support factor, F=Compression Force and C=Compression Percentage).

TABLE 4

HIGHER COMPRESSION FORCE TESTING

| | 6051 | 6052 | 6053 | 6054 |
| --- | --- | --- | --- | --- |
| | | Units | | |
| % Compression | lbf | lbf | lbf | lbf |
| 25% | 4.75 | 3.22 | 2.19 | 2.57 |
| 40% | 5.58 | 4.19 | 2.97 | 3.4 |
| 50% | 6.47 | 5 | 4.03 | 4.23 |
| 60% | 8.11 | 7.07 | 5.68 | 5.81 |
| 70% | 11.82 | 11.64 | 9.49 | 10.01 |
| 80% | 24.06 | 27.38 | 23.61 | 24.13 |
| 85% | 43.09 | 54 | 47.05 | 47.6 |
| 90% | 105.08 | 146.28 | 129.44 | 130.03 |

Improved Thermal Conductivity

Another advantage of the methods and compositions herein is an improvement in the thermal conductivity or heat transfer properties. A thermal conductivity apparatus 60 was built according to FIG. 6. A foam sample 62 is placed between two ½" thick acrylic plates 64 bounded on either side by 1" thick polystyrene board 66 and 1½" plastic spacers 68. The apparatus 60 is capped on the top and bottom by ¼" aluminum plates 70 and a silicone heater pad 72 is located on the bottom of the lowermost aluminum plate 70. Four Type K thermocouples 74 are located in the center on each side of the acrylic plates 64 with a known distance of each thermocouple from each edge.

The thermal conductivities for a non-gel foam sample (Sample 6051) and a gel-foam sample (Sample 6052) were tested. The 3-inch thick sample thickness was compressed to 0.5 inches to remove air pockets in the foam. Table 5 shows the test results and the calculated thermal conductivity for each foam sample tested. The gel foam sample (Sample 6052) showed a 29.2% improvement in thermal conductivity relative to the control non-gel sample (Sample 6051).

diblock copolymer resin, gel additives, gel particles, polyols, isocyanates, catalysts and additives used may be different from those used explicitly mentioned or suggested here. Additionally, techniques and methods for improving the properties and/or processing characteristics of combinations of gelatinous elastomers and polyurethane foams other than those specifically mentioned may find utility in the methods herein. Various combinations of triblock and/or diblock gelatinous elastomer resins, polyols, isocyanates, catalysts and additives, and processing pressures besides those explicitly mentioned herein are expected to be useful.

The words "comprising" and "comprises" as used throughout the claims is interpreted "including but not limited to".

The present invention may suitably comprise, consist or consist essentially of the elements disclosed and may be practiced in the absence of an element not disclosed. For instance, a combination of gelatinous elastomer and open cell flexible polyurethane foam may be produced by a method consisting of or consisting essentially of crosslinking a plasticized copolymer resin selected from the group consisting of a triblock copolymer resin, a diblock copolymer resin, and

TABLE 5

THERMAL CONDUCTIVITY RESULTS

Control 6051 - 3" thick compressed to 0.5"
Centerline hole from edge: 0.094"

|  | Thickness in. | K Btu/(hr-ft° F.) | Area ft² | Resistance (hr-° F.)/Btu | Inlet Temp ° F. | Outlet Temp ° F. | Delta Temp ° F. |
|---|---|---|---|---|---|---|---|
| Acrylic | 0.285 | 0.1135 | 0.085 | 2.460 | 201 | 193.4 | 7.65 |
| Acrylic | 0.094 | 0.1135 | 0.085 | 0.811 | 193.4 | 190.8 | 2.52 |
| Control 6051 | 0.5 | 0.0226 | 0.085 | 21.657 | 190.8 | 123.5 | 67.35 |
| Acrylic | 0.094 | 0.1135 | 0.085 | 0.811 | 123.5 | 120.9 | 2.52 |
| Acrylic | 0.285 | 0.1135 | 0.085 | 2.460 | 120.9 | 113.3 | 7.65 |

Total Delta Temp 87.7° F.
Total Heat Flow 3.11 Btu/hr

Gel 6052 - 3" thick compressed to 0.5"
Centerline hole from edge: 0.094"

|  | Thickness in. | K Btu/(hr-ft° F.) | Area ft² | Resistance (hr-° F.)/Btu | Inlet Temp ° F. | Outlet Temp ° F. | Delta Temp ° F. |
|---|---|---|---|---|---|---|---|
| Acrylic | 0.285 | 0.1135 | 0.085 | 2.460 | 186.3 | 178.0 | 8.35 |
| Acrylic | 0.094 | 0.1135 | 0.085 | 0.811 | 178.0 | 175.2 | 2.75 |
| Gel 6052 | 0.5 | 0.0292 | 0.085 | 16.759 | 175.2 | 118.3 | 56.89 |
| Acrylic | 0.094 | 0.1135 | 0.085 | 0.811 | 118.3 | 115.5 | 2.75 |
| Acrylic | 0.285 | 0.1135 | 0.085 | 2.460 | 115.5 | 107.2 | 8.35 |

Total Delta Temp 79.1° F.
Total Heat Flow 3.39 Btu/hr
% Increase in Thermal Conductivity between Gel-foam Foam Sample 6052 and Non-gel Foam Sample 6051: 29.2%

Improved Heat Capacity

Open cell, flexible polyurethane foams produced with in-situ gel or gel particles are also expected to have higher heat capacity than non-gel polyurethane foams. This property is important when the polyurethane foams with in-situ gel are used in bedding products. Higher heat capacity in combination with higher thermal conductivity will transfer heat away from the contact surface between a person and the foam. The foam will thus have a cooler feel for a person in contact with the foam.

Many modifications may be made in the methods of and implementation of this invention without departing from the spirit and scope thereof that are defined only in the appended claims. For example, the exact triblock copolymer resin, combinations thereof, to give a cured gel; reducing the size of the cured gel into gel particles having an average particle size of about 10 millimeters or less; introducing the gelled particles into a mixture of polyurethane foam forming components comprising a polyol and an isocyanate; and polymerizing the polyol and the isocyanate to form an open cell flexible polyurethane foam; where the gel particles are added in the range of about 0.1 to about 200 parts per hundred of the polyol component of open cell flexible polyurethane foam.

Additionally there may be provided a combination of gelatinous elastomer and open cell flexible polyurethane foam consisting of or consisting essentially of cured gel particles comprising crosslinked plasticized copolymer resin selected from the group consisting of a triblock copolymer resin, a diblock copolymer resin, and combinations thereof, the gel particles having an average particle size of about 10 millimeters or less within an open cell flexible polyurethane foam; where the gel particles are present in the range of about 0.1 to about 200 parts per hundred of the polyol component of open cell flexible polyurethane foam.

What is claimed is:

1. A combination of gel particles and open cell flexible polyurethane foam produced by the method comprising:
    crosslinking a plasticized copolymer resin selected from the group consisting of a triblock copolymer resin selected from the group consisting of styrene-ethylene-butylene-styrene (SEBS), styrene-ethylene-propylene-styrene (SEPS), styrene-ethylene-ethylene-propylene-styrene (SEEPS), and combinations thereof, a diblock copolymer resin selected from the group consisting of styrene-ethylene-propylene (SEP), styrene-ethylene-butylene (SEB), styrene-ethylene-ethylene (SEE), and combinations thereof, and combinations thereof, to give a cured gel;
    reducing the size of the cured gel into gel particles having an average particle size of about 10 millimeters or less;
    introducing the gelled particles into a mixture of polyurethane foam forming components comprising a polyol and an isocyanate; and
    polymerizing the polyol and the isocyanate to form an open cell flexible polyurethane foam;
    where the gel particles are added in the range of about 0.1 to about 200 parts per hundred of the polyol component of open cell flexible polyurethane foam.

2. The combination of claim 1 wherein the copolymer resin is at least partially melted by heat produced by polymerizing the polyol and the isocyanate to form the open cell flexible polyurethane foam.

3. The combination of claim 1 where the copolymer resin is a triblock copolymer resin and the copolymer resin is added in the range of about 0.1 to about 200 parts per hundred of the polyol component of open cell flexible polyurethane foam.

4. The combination of claim 1 where the copolymer resin is formed by compounding a copolymer with at least one plasticizing oil.

5. The combination of claim 4 where the copolymer resin comprises a colorant selected from the group consisting of inorganic pigment, carbon black, organic colorant, organic dye, reactive colorant, reactive dye and combinations thereof, and where the colorant is present in an amount up to about 50 parts per hundred of the copolymer resin.

6. The combination of claim 4 where the plasticizing oil is selected from the group consisting of a paraffinic mineral oil, naphthenic mineral oil, synthetic oil produced from polybutenes, polypropenes, polyterpenes, paraffins, isoparaffins, polyols, polyoxyalkyleneamines, glycols, soybean-based polyols, castor bean-based polyols, canola oil, safflower oil, sunflower oil, soybean oil, castor oil and combinations thereof, and the plasticizing oil is present in the range of from about 1 to about 1400 parts per hundred of copolymer resin.

7. The combination of claim 1 where the copolymer resin further comprises an inert carrier selected from the group consisting of non-polar carriers, polar carriers, polyether polyol carriers, isocyanate/polyether prepolymers, liquid or solid flame retardants, and/or blowing agents.

8. The combination of claim 1 where the gelled particles have an average volume between about 0.001 and about 1000 $mm^3$.

9. An article of manufacture comprising the combination of gel particles and open cell flexible polyurethane foam of claim 1, where the article is selected from the group consisting of rebond carpet pads, floor mats, shoe inserts, medical foams, mattresses, pillows, bedding products, seat cushions, seat backs, head rests, armrests and combinations thereof.

10. An article of manufacture comprising the combination of gel particles and open cell flexible polyurethane foam of claim 1 where the polyurethane foam is selected from the group consisting of polyether polyurethane foam, high-resiliency polyether polyurethane foam, viscoelastic polyether polyurethane foam, and combinations thereof.

11. The article of manufacture of claim 10 where the article of manufacture is produced employing a technique selected from the group consisting of free rise, molded, and combinations thereof.

12. An article of manufacture comprising the combination of gel particles and open cell flexible polyurethane foam of claim 1 wherein the combination of gel particles and polyurethane foam is layered with at least one other material selected from the group consisting of:
    a flexible viscoelastic foam,
    a flexible resilient polyurethane foam;
    a flexible high resilient (HR) foam,
    a latex foam, and
    combinations thereof.

13. The article of manufacture of claim 12 selected from the group consisting of mattresses, bedding products, pillows, furniture cushioning, wheelchairs, medical pads, medical supports, sports equipment, transportation seating and combinations thereof.

14. A combination of gel particles and open cell flexible polyurethane foam comprising:
    cured gel particles comprising crosslinked plasticized copolymer resin selected from the group consisting of a triblock copolymer resin_selected from the group consisting of styrene-ethylene-butylene-styrene (SEBS), styrene-ethylene-propylene-styrene (SEPS), styrene-ethylene-ethylene-propylene-styrene (SEEPS), and combinations thereof, a diblock copolymer resin selected from the group consisting of styrene-ethylene-propylene (SEP), styrene-ethylene-butylene (SEB), styrene-ethylene-ethylene (SEE), and combinations thereof, and combinations thereof, the gel particles having an average particle size of about 10 millimeters or less within
    an open cell flexible polyurethane foam;
    where the gel particles are present in the range of about 0.1 to about 200 parts per hundred of the polyol component of open cell flexible polyurethane foam.

15. The combination of claim 14 wherein at least a portion of the cured gel particles are at least partially melted within the open cell flexible polyurethane foam.

16. The combination of claim 14 where the copolymer resin is a triblock copolymer resin.

17. The combination of claim 14 where the copolymer resin is formed by compounding a copolymer with at least one plasticizing oil.

18. The combination of claim 17 where the plasticizing oil is selected from the group consisting of a paraffinic mineral oil, naphthenic mineral oil, synthetic oil produced from polybutenes, polypropenes, polyterpenes, paraffins, isoparaffins, polyols, polyoxyalkyleneamines, glycols, soybean-based polyols, castor bean-based polyols, canola oil, safflower oil, sunflower oil, soybean oil, castor oil and combinations thereof, and the plasticizing oil is present in the range of from about 1 to about 1400 parts per hundred of copolymer resin.

19. The combination of claim 14 where the gelled particles have an average volume between about 0.001 and about 1000 $mm^3$.

20. An article of manufacture comprising the combination of gel particles and open cell flexible polyurethane foam of claim 14, where the article is selected from the group consisting of rebond carpet pads, floor mats, shoe inserts, medical foams, mattresses, pillows, bedding products, seat cushions, seat backs, head rests, armrests and combinations thereof.

21. An article of manufacture comprising the combination of gel particles and open cell flexible polyurethane foam of claim 14 where the polyurethane foam is selected from the group consisting of polyether polyurethane foam, high-resiliency polyether polyurethane foam, viscoelastic polyether polyurethane foam, and combinations thereof.

22. The article of manufacture of claim 21 where the article of manufacture is produced employing a technique selected from the group consisting of free rise, molded, and combinations thereof.

23. An article of manufacture comprising the combination of gel particles and open cell flexible polyurethane foam of claim 14 wherein the combination of gel particles and polyurethane foam is layered with at least one other material selected from the group consisting of:
   a flexible viscoelastic foam,
   a flexible resilient polyurethane foam;
   a flexible high resilient (HR) foam,
   a latex foam, and
   combinations thereof.

24. The article of manufacture of claim 23 selected from the group consisting of mattresses, bedding products, pillows, furniture cushioning, wheelchairs, medical pads, medical supports, sports equipment, transportation seating and combinations thereof.

25. A combination of gel particles and open cell flexible polyurethane foam produced by the method comprising:
   cured gel particles comprising crosslinked plasticized copolymer resin that is a triblock copolymer resin and optionally a diblock copolymer resin, the gel particles having an average particle size of about 10 millimeters or less within
   an open cell flexible polyurethane foam;
   where:
   the gel particles are present in the range of about 0.1 to about 200 parts per hundred of the polyol component of open cell flexible polyurethane foam;
   where at least a portion of the cured gel particles are at least partially melted within the open cell flexible polyurethane foam; and
   where the crosslinked plasticized copolymer resin is a triblock copolymer resin selected from the group consisting of styrene-ethylene-butylene-styrene (SEBS), styrene-ethylene-propylene-styrene (SEPS), styrene-ethylene-ethylene-propylene-styrene (SEEPS), and combinations thereof; and the diblock copolymer resin, if present, is selected from the group consisting of styrene-ethylene-propylene (SEP), styrene-ethylene-butylene (SEB), styrene-ethylene-ethylene (SEE), and combinations thereof.

* * * * *